United States Patent
Sun et al.

(10) Patent No.: US 12,011,113 B2
(45) Date of Patent: Jun. 18, 2024

(54) TOASTER

(71) Applicant: Tsann Kuen (Zhangzhou) Enterprise Co., Ltd., Fujian (CN)

(72) Inventors: Xiaosen Sun, Fujian (CN); Yangtai He, Fujian (CN); Ziwang Wu, Fujian (CN)

(73) Assignee: TSANN KUEN (ZHANGZHOU) ENTERPRISE CO., LTD., Fujian (CN)

(*) Notice: Subject to any disclaimer, the term of this patent is extended or adjusted under 35 U.S.C. 154(b) by 642 days.

(21) Appl. No.: 17/322,465

(22) Filed: May 17, 2021

(65) Prior Publication Data
US 2021/0393078 A1  Dec. 23, 2021

(30) Foreign Application Priority Data
Jun. 19, 2020  (CN) .......................... 202010564695.1

(51) Int. Cl.
*A47J 37/08* (2006.01)
*H05B 1/02* (2006.01)

(52) U.S. Cl.
CPC ........ *A47J 37/0842* (2013.01); *H05B 1/0225* (2013.01)

(58) Field of Classification Search
CPC .......................... A47J 37/0842; H05B 1/0225
See application file for complete search history.

(56) References Cited

U.S. PATENT DOCUMENTS

| | | | | |
|---|---|---|---|---|
| 2,879,707 A * | 3/1959 | Ambrose | ............ | H05B 1/0225 99/338 |
| 3,129,650 A * | 4/1964 | Visos | .................. | A47J 37/0814 99/329 R |
| 3,956,978 A * | 5/1976 | Borley | .................. | A47J 37/085 219/508 |
| 6,298,772 B1 * | 10/2001 | Nguyen | .................. | A47J 37/08 219/521 |
| 6,481,341 B1 * | 11/2002 | Choi | .................. | A47J 37/0842 99/332 |
| 6,571,687 B1 * | 6/2003 | Wu | .................... | A47J 37/0842 219/521 |
| 8,336,449 B2 * | 12/2012 | Brady | ................ | A47J 37/0814 99/389 |
| 9,215,951 B2 * | 12/2015 | Korbin | ................ | A47J 37/0807 |
| 2004/0144257 A1 * | 7/2004 | Battu | ................ | G05D 23/1951 99/385 |
| 2012/0097044 A1 * | 4/2012 | Choi | .................. | A47J 37/0842 99/327 |
| 2013/0247778 A1 * | 9/2013 | Legatti | ................ | A47J 37/0814 361/103 |

* cited by examiner

*Primary Examiner* — Sean M Michalski
(74) *Attorney, Agent, or Firm* — MUNCY, GEISSLER, OLDS & LOWE, PC (57) ABSTRACT

A toaster includes an activation element, a power circuit, a heating device and a control device. When the activation element is moved to turn on the power circuit, the control device is powered such that an electromagnet is activated to attract a retaining element to hold the activation element and to actuate a two-state switch, which allows passage of electrical power to the heating device. After a time interval has elapsed, the control device stops the electromagnet from attracting the retaining element such that the retaining element no longer actuates the two-state switch, which cuts off electric power provided to the heating device.

7 Claims, 9 Drawing Sheets

TOASTER

CROSS-REFERENCE TO RELATED APPLICATION

This application claims priority to Chinese Invention Patent Application No. 202010564695.1, filed on Jun. 19, 2020.

FIELD

The disclosure relates to a small domestic appliance, and more particularly to a toaster with a safety power cut off mechanism.

BACKGROUND

A conventional toaster includes a chassis, a carriage for carrying one or more slices of bread, a lever connected to the carriage and having one end protruding outside the chassis, a heating element and a control circuit. When the lever is operated to lower the carriage which carries the bread into the chassis, the lever causes the control circuit to allow for supply of power to the heating element so that the bread is heated by the heating element. Meanwhile, the control circuit activates an electromagnet to attract the lever to a fixed position, and controls the electromagnetic to release the lever after a preset heating time has elapsed. Once released, the lever is pushed upward by a spring, and the control circuit no longer allows for the supply of power (power supply is cut off) and the heating element stops heating.

However, the lever may be stuck and unable to be pushed upward because of mechanical failure. In this scenario, the lever would cause the control circuit to control the heating element to keep heating the bread even after the heating time has elapsed, which may cause safety hazard.

SUMMARY

Therefore, an object of the disclosure is to provide a toaster that can alleviate at least one of the drawbacks of the prior art.

The toaster includes an activation element, an elastic element, a power circuit, a heating device and a control device.

The activation element is configured to move between a turn-off position and a turn-on position.

The elastic element is configured to provide a reaction force that drives the activation element to move from the turn-on position to the turn-off position.

The power circuit is configured to connect to mains electricity to receive electrical power therefrom. The power circuit includes a live wire, a neutral wire, a first switch connected with the live wire, and a second switch connected with the neutral wire. The first switch and the second switch are configured to be turned on when the activation element is at the turn-on position.

The control device is electrically connected to the heating device and the power circuit, and is configured to receive electrical power from the power circuit when the first switch and the second switch are turned on. The control device includes an electromagnet, a retaining element, a timing element, a two-state switch, a first rectifier circuit and a second rectifier circuit.

The retaining element is magnetically attractable and is configured to move between a first position and a second position, to stay at the first position when not being magnetically attracted by the electromagnet, and to stay at the second position when being magnetically attracted by the electromagnet in order to hold the activation element at the turn-on position.

The timing element is configured to count a time interval, and to control the electromagnet to continuously produce, only during the time interval, a magnetic force that attracts the retaining element to move to and be retrained at the second position.

The two-state switch is implemented as a micro switch, is connected between the first switch of the power circuit and the heating device, and is configured to be set at a first configuration and a second configuration when the retaining element is at the first position and the second position, respectively.

The first rectifier circuit is connected between the two-state switch and a common node to which the electromagnet and the timing element are connected, and is configured to, when the first switch and the second switch are turned on and when the two-state switch is at the first configuration where the two-state switch electrically connects the first switch and the first rectifier circuit, provide electrical power to the electromagnet and the timing element.

The second rectifier circuit is connected between the heating device and the common node, and is configured to, when the first switch and the second switch are turned on and when the two-state switch is at the second configuration where the two-state switch electrically connects the first switch and the heating device, provide electrical power to the electromagnet and the timing element.

The heating device is configured to, when the two-state switch is at the second configuration, convert electrical power received from the power circuit to thermal energy, and provide a fraction of the electrical power to the second rectifier circuit.

The timing element is further configured to, in response to the activation element being moved to the turn-on position, be powered on by receiving electrical power from the first rectifier circuit, start counting the time interval, and control the electromagnet to produce the magnetic force to attract the retaining element to the second position, which in turn actuates the two-state switch to transition from the first configuration to the second configuration.

When the two-state switch is at the second configuration, the timing element receives electrical power from the second rectifier circuit, and controls the electromagnet to continuously produce the magnetic force during the time interval.

After the time interval has elapsed, the timing element controls the electromagnet to stop producing the magnetic force, which in turn causes the retaining element to return from the second position to the first position, so that the activation element is released from the turn-on position and is moved to the turn-off position by the reaction force provided by the elastic element, and so that the two-state switch transitions from the second configuration to the first configuration to electrically disconnect the heating device from the first switch of the power circuit.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
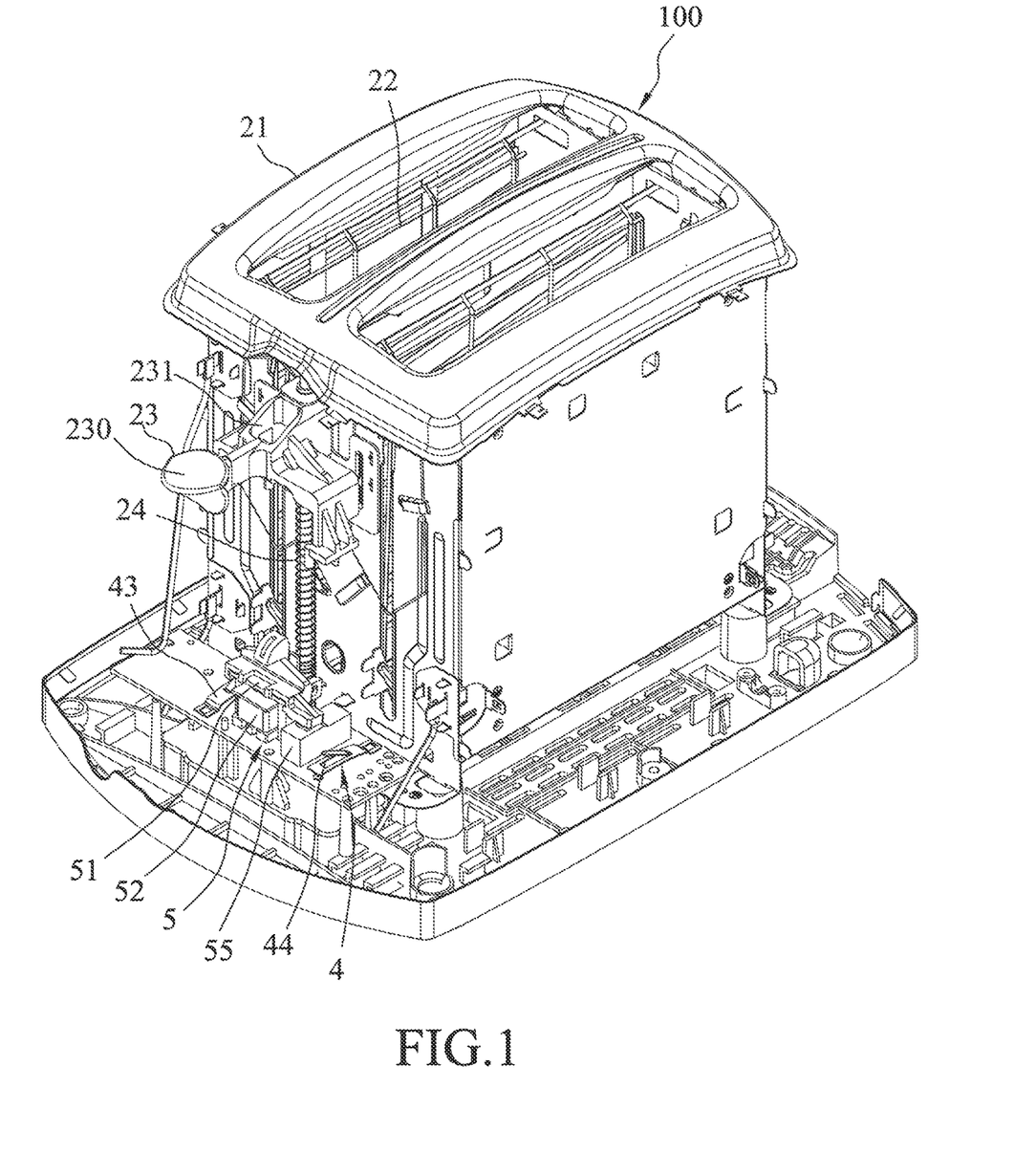
FIG. 1 is a perspective view illustrating an embodiment of a toaster according to the disclosure.
Figure 2:
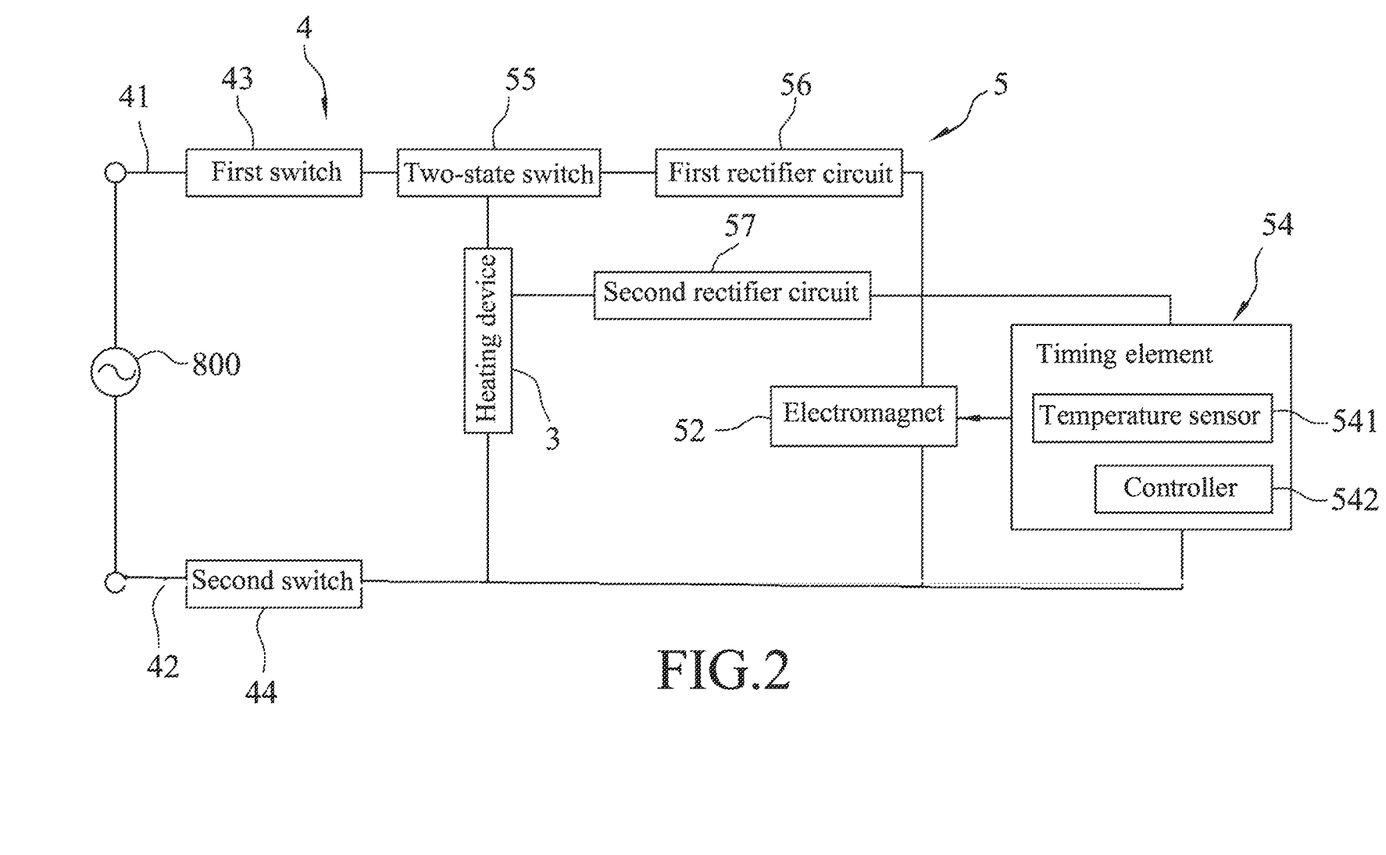
FIG. 2 is a circuit block diagram of the embodiment of the toaster according to the disclosure.
Figure 3:
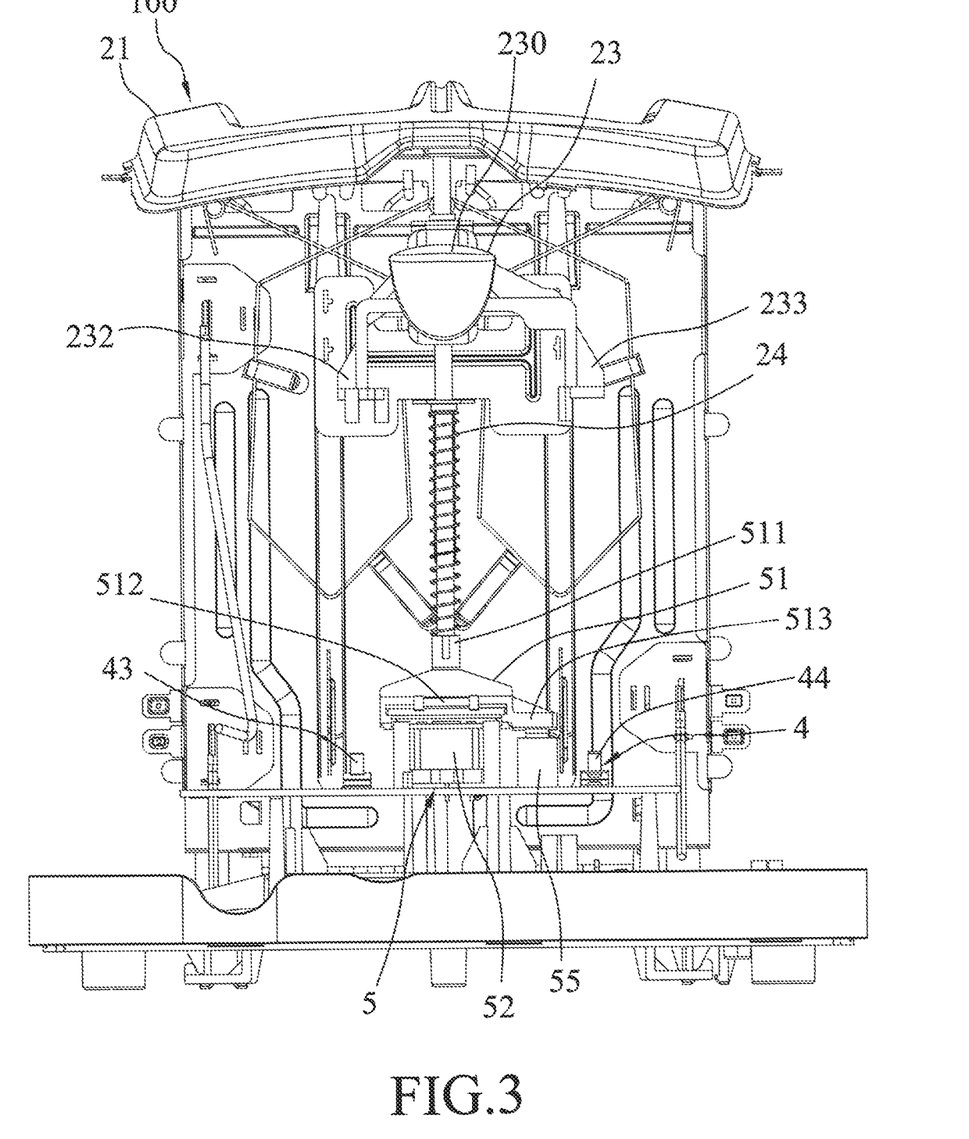
FIG. 3 is a front view illustrating an activation element at a turn-off position according to the disclosure.

Referring to FIGS. 1 to 3, an embodiment of a toaster 100 according to the disclosure includes a chassis 21, a carriage 22 for carrying one or more slices of bread, an activation element 23, an elastic element 24, a heating device 3, a power circuit 4, and a control device 5. The carriage 22 is disposed in and vertically movable relative to the chassis 21. The activation element 23 is connected to the carriage 22 and includes an operable portion 230 protruding outward from an operation side of the chassis 21. The elastic element 24 is disposed between the chassis 21 and the activation element 23 and configured to push the activation element 23 upward relative to the chassis 21. The heating device 3 is disposed in the chassis 21 and configured to heat the bread. The power circuit 4 is disposed in the chassis 21 and configured to connect to mains electricity 800 to receive electrical power therefrom. The control device 5 is disposed in the chassis 21 and electrically connected to the heating device 3 and the power circuit 4. The elastic element 24 is implemented to be, but is not limited to, a compression spring. The heating device 3 is implemented to be, but is not limited to, a resistance wire.

The activation element 23 is configured to move between a turn-off position and a turn-on position relative to the chassis 21. Specifically, the activation element 23 is able to be pressed downward to move from the turn-off position to the turn-on position, and drives the carriage 22 to move downward relative to the chassis 21 so as to move the bread carried by the carriage 22 into the chassis 21 and adjacent to the heating device 3. The elastic element 24 provides a reaction force (or a resilient force) to drive the activation element 23 from the turn-on position to the turn-off position. The heating device 3 is able to be powered to generate thermal energy so as to toast the bread moved by the carriage 22 into the chassis 21. Since the chassis 21, the carriage 22, the elastic element 24 and the heating device 3 can take various forms and configurations, discussion relating to variations in designs thereof is omitted herein for the sake of brevity.

The operable portion 230 of the activation element 23 is configured to receive manual operations (e.g., to be pressed downward by hand). The activation element 23 further includes a hook portion 231 that is connected to the operable portion 230, and a first press portion 232 and a second press portion 233 that are respectively connected to lateral sides of the hook portion 231.

Figure 4:
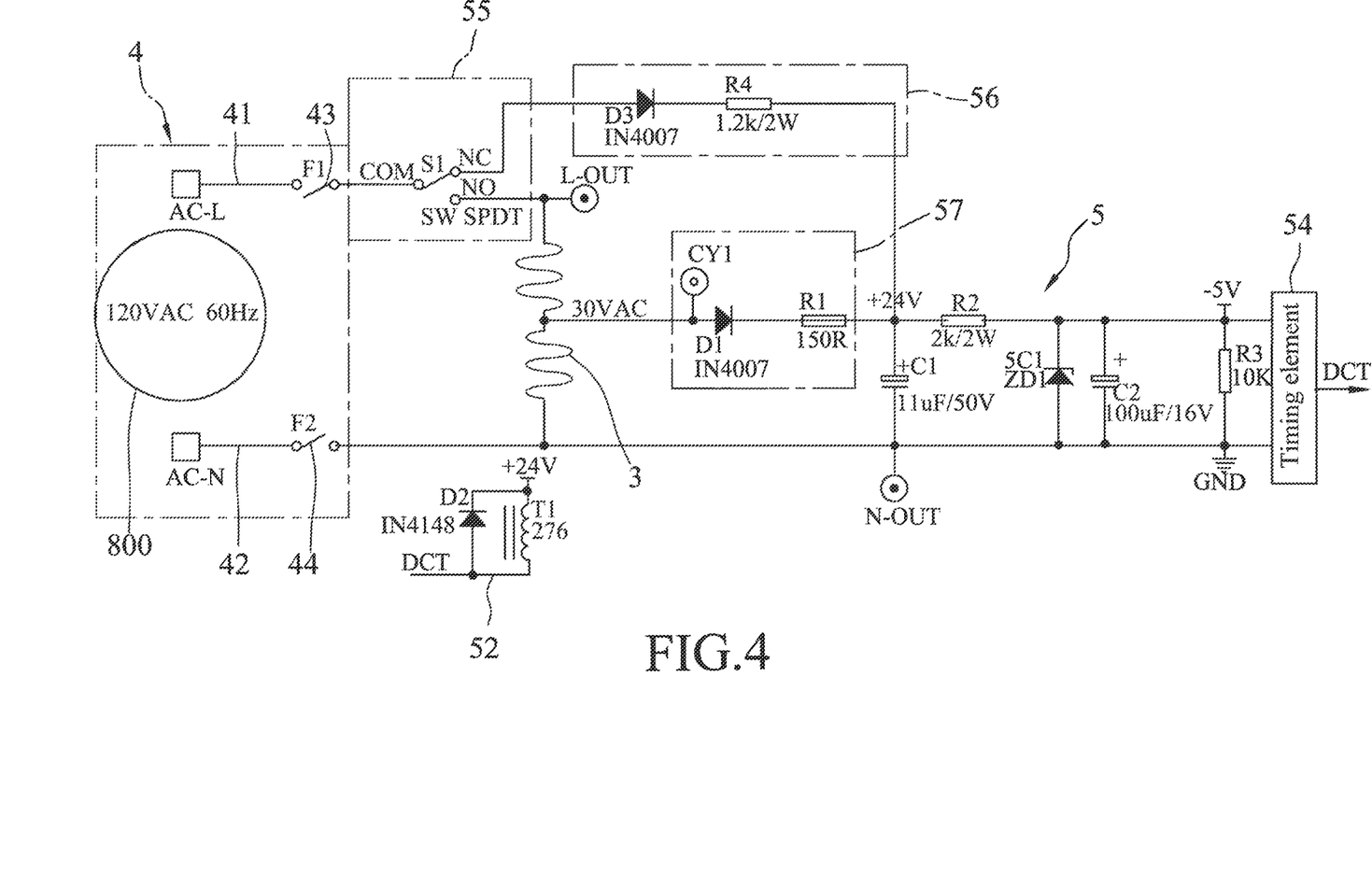
FIG. 4 is an exemplary circuit diagram of the embodiment of the toaster according to the disclosure.

Referring to FIGS. 2, 3 and 4, the power circuit 4 includes a live wire 41, a neutral wire 42, a first switch 43 connected with the live wire 41, and a second switch 44 connected with the neutral wire 42. The first switch 43 and the second switch 44 are implemented as two snap action switches, and are respectively located under the first press portion 232 and the second press portion 233 of the activation element 23. The first press portion 232 and the second press portion 233 are configured to respectively press on the first switch 43 and the second switch 44 when the activation element 23 is at the turn-on position, in order to turn on the first switch 43 and the second switch 44. The control device 5 is configured to receive electrical power from the power circuit 4 when the power circuit 4 is connected to the mains electricity 800 and when the first switch 43 and the second switch 44 are turned on.

Referring to FIGS. 2, 4, 5 and 6, the control device 5 includes a retaining element 51, an electromagnet 52 that has an attractive side, an elastic part 53, a timing element 54 that is electrically connected to the electromagnet 52, a two-state switch 55 that is electrically connected between the first switch 43 of the power circuit 4 and the heating device 3, a first rectifier circuit 56 that is electrically connected between the two-state switch 55 and a common node to which the electromagnet 52 and the timing element 54 are connected (see FIG. 2), and a second rectifier circuit 57 that is electrically connected between the heating device 3 and the common node. The retaining element 51 is disposed at the operation side of the chassis 21 and under the activation element 23, and is pivotable relative to the activation element 23 about a transverse axis. The electromagnet 52 is disposed on the chassis 21 and under the retaining element 51, and is configured to produce a magnetic force. The retaining element 51 is at the attractive side of the electromagnet 52. The elastic part 53 is disposed between the retaining element 51 and the chassis 21, and is configured to provide an elastic force that drives the retaining element 51 to move away from the electromagnet 52. The first rectifier circuit 56 and the second rectifier circuit 57 are configured to provide electrical power to the electromagnet 52 and the timing element 54.

Figure 5:
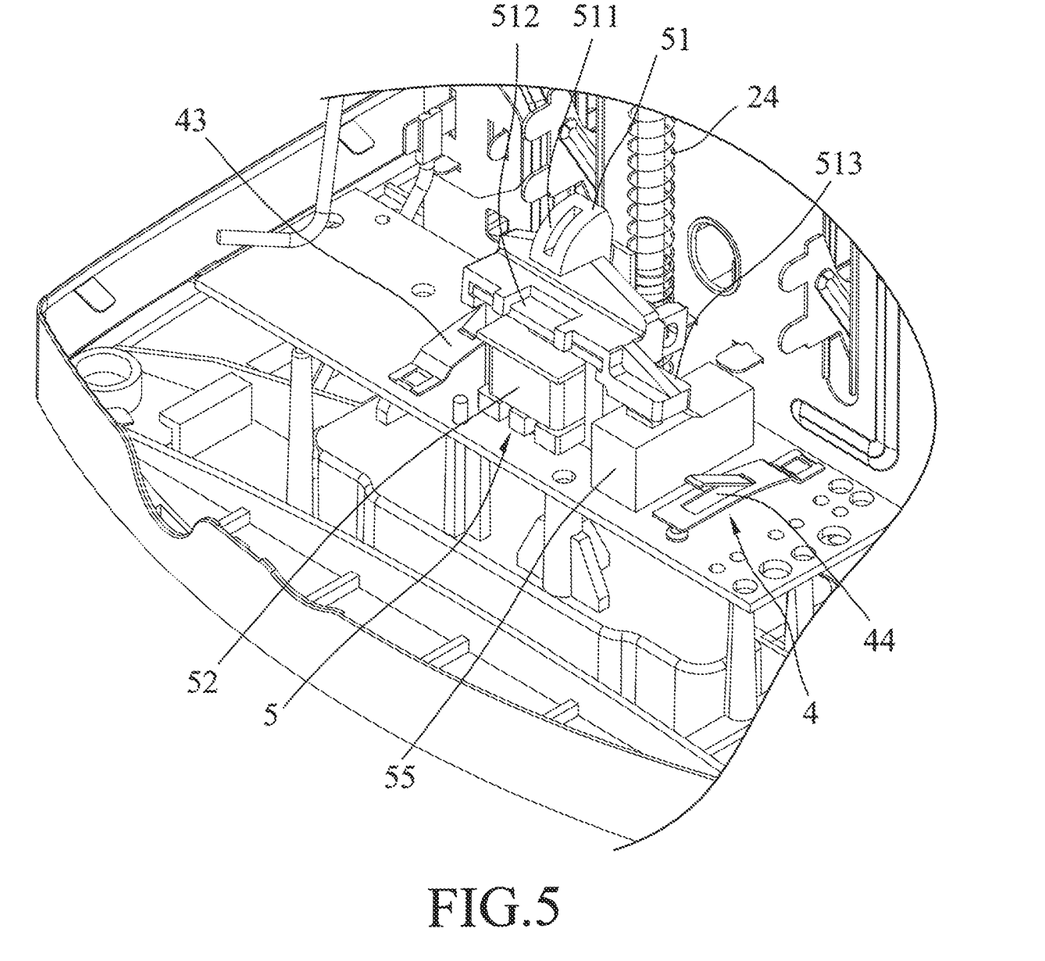
FIG. 5 is a fragmentary perspective view illustrating a retaining element, an electromagnet and a two-state switch according to the disclosure.
Figure 6:
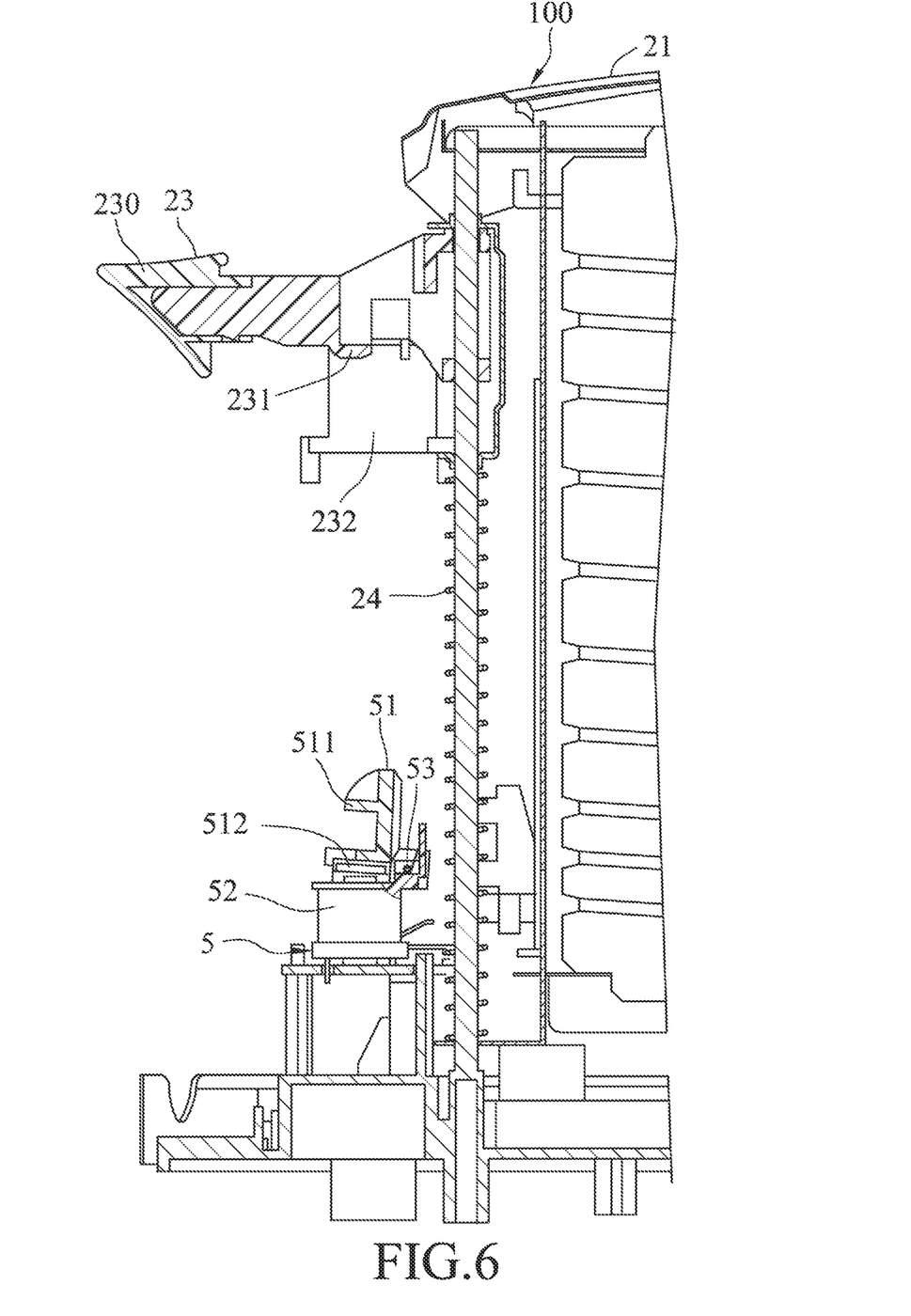
FIG. 6 is a fragmentary sectional view illustrating the retaining element at a first position according to the disclosure.
Figure 7:
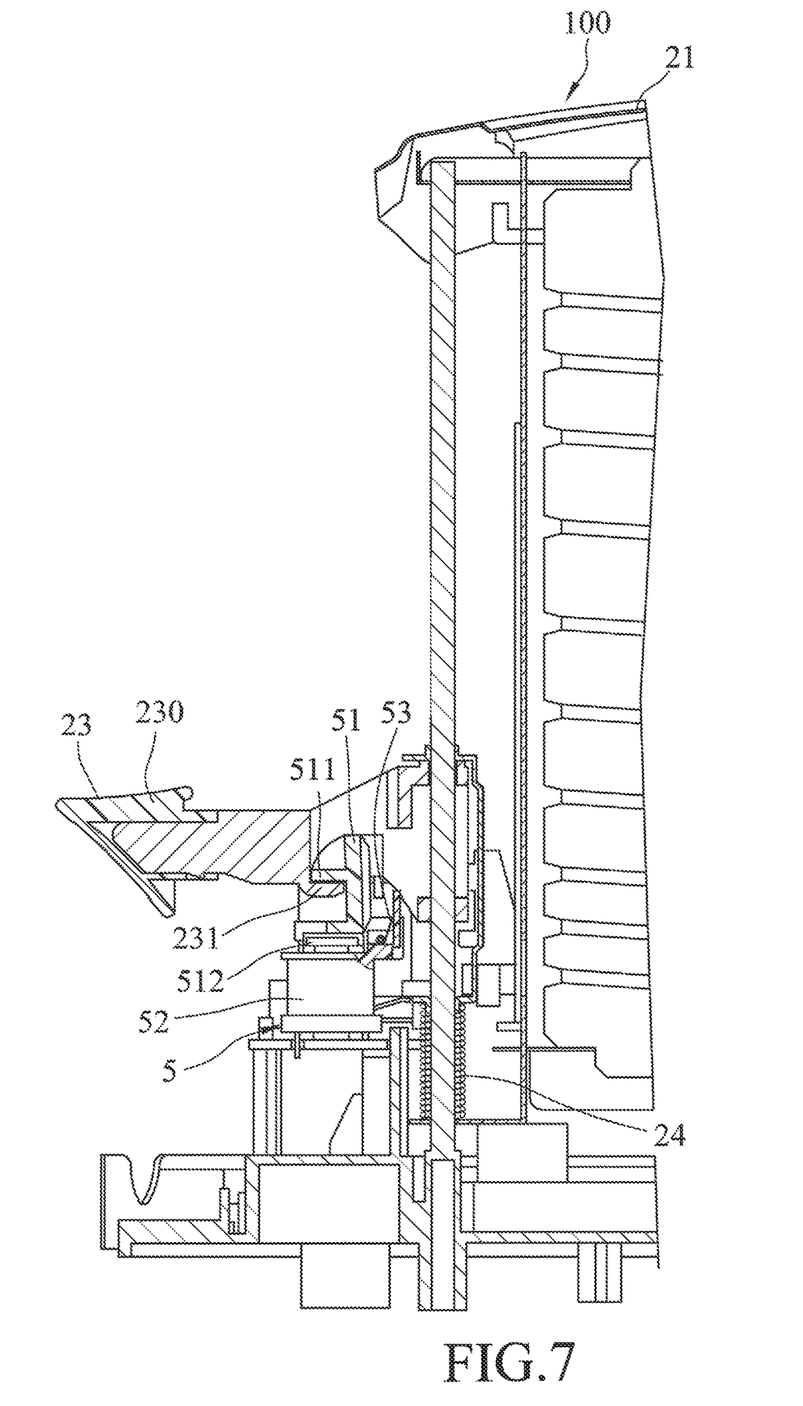
FIG. 7 is a fragmentary sectional view illustrating the retaining element at a second position and engaging with the activation element according to the disclosure.

Referring to FIGS. 5, 6 and 7, the retaining element 51 is magnetically attractable and is configured to move between a first position, where the retaining element 51 is away from the electromagnet 52, (see FIG. 6), and a second position (see FIG. 7), where the retaining element 51 abuts against the electromagnet 52. The retaining element 51 is further configured to stay at the first position when not being magnetically attracted by the electromagnet 52, and to stay at the second position when being magnetically attracted by the electromagnet 52 in order to hold the activation element 23 at the turn-on position (see FIG. 7).

Specifically, the retaining element 51 includes a lock part 511 that is pivotally connected to the chassis 21 and that is configured to prevent the activation element 23 at the turn-on position from moving toward the turn-off position, a magnetic part 512 that is disposed on the lock part 511, and an extension part 513 that extends from a lateral side of the lock part 511 and that is positioned above the two-state switch 55. The magnetic part 512 is made of a magnetically attractable material, and is to be magnetically attracted to the attractive side of the electromagnet 52 by the magnetic force of the electromagnet 52 so as to bring the lock part 511 to pivot toward the electromagnet 52 (i.e., the retaining element 51 is moved to the second position), so that the lock part 511 engages with the hook portion 231 of the activation element 23 when the activation element 23 is at the turn-on position, in order for the activation element 23 to be held at the turn-on position. Meanwhile, the lock part 511 brings the extension part 513 to press on the two-state switch 55 in order to actuate the two-state switch 55. The elastic part 53 is implemented as a torsion spring, is disposed between the lock part 511 and the chassis 21, and is configured to provide the elastic force that drives the lock part 511 to move away from the electromagnet 52 (i.e., to move from the second position to the first position).

Figure 8:
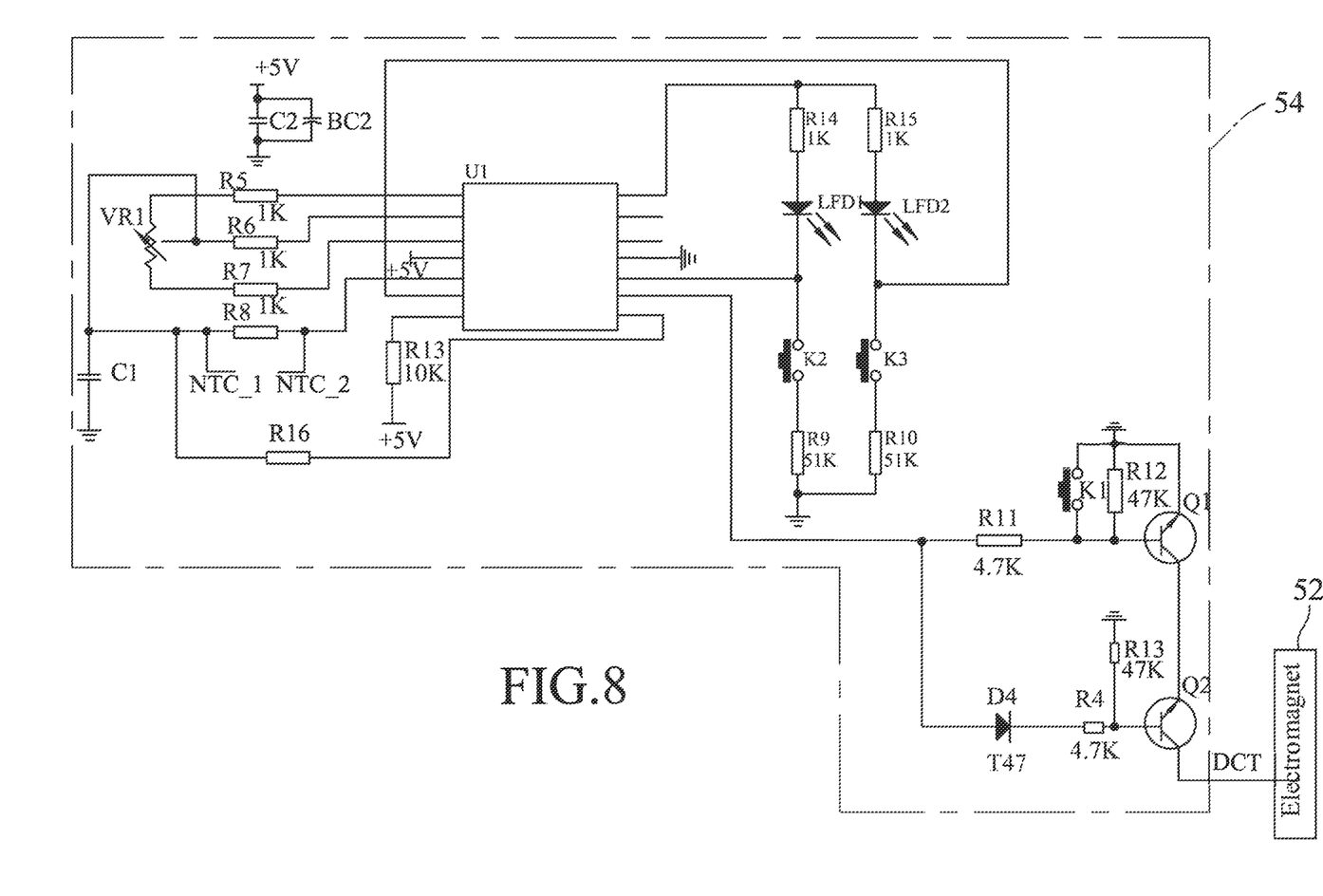
FIG. 8 is an exemplary circuit diagram of an embodiment of a timing element according to the disclosure.
Figure 9:
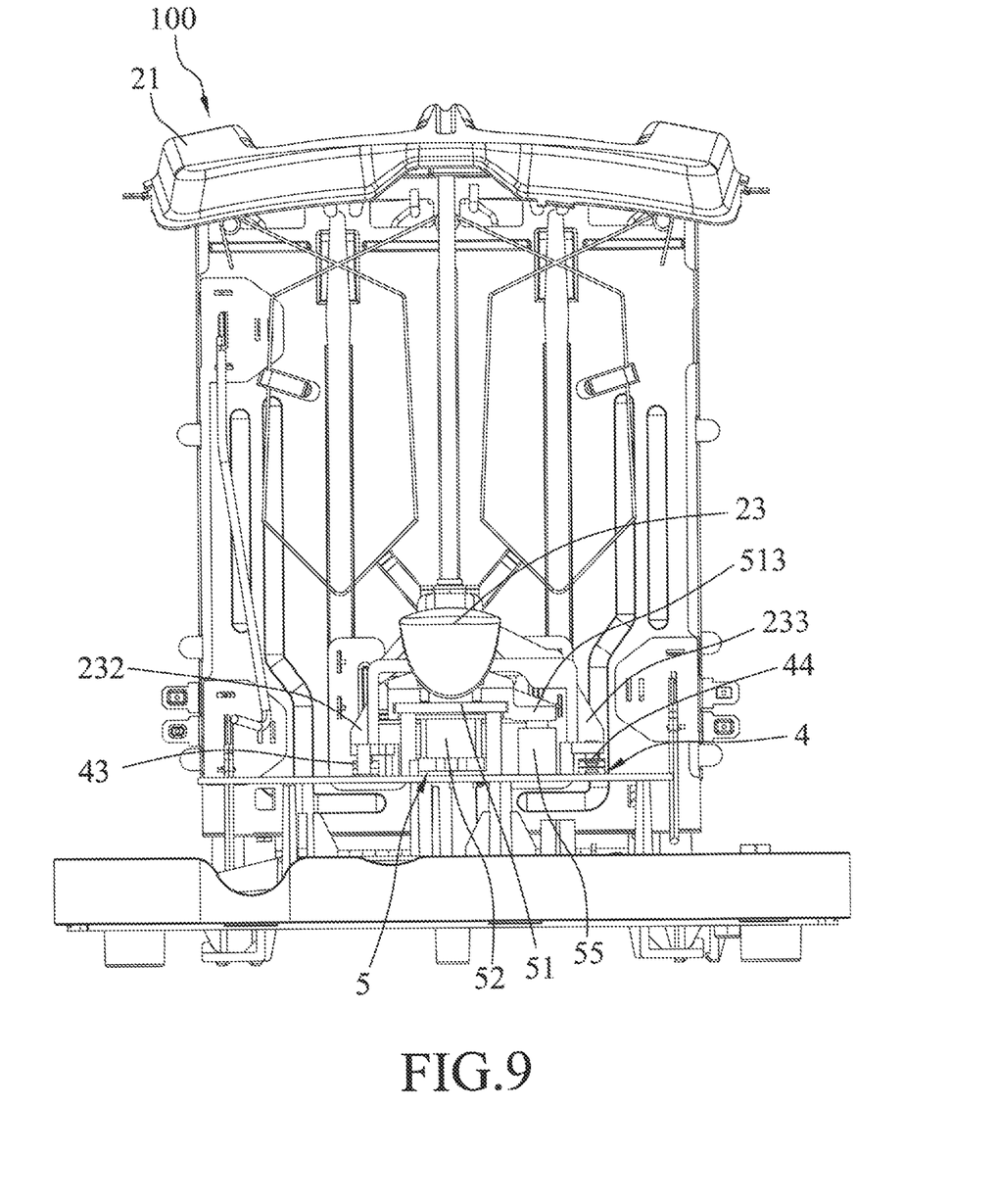
FIG. 9 is a front view illustrating the activation element at a turn-on position and the retaining element at the second position according to the disclosure.

Referring to FIGS. 2, 4 and 8, the timing element 54 is configured to count a time interval (either counting down from the time interval or counting upwards from zero to the time interval) which is set beforehand, such as 60 seconds, and to control the electromagnet 52 to continuously produce, only during the time interval, the magnetic force that attracts the retaining element 51 to move to and be retained at the second position. Specifically, the timing element 54 includes a temperature sensor 541 that is configured to measure a temperature of the heating device 3, and a controller 542 that is configured to count the time interval. The controller 542 may also be configured to shorten the time interval when the temperature measured by the temperature sensor 541 is above a threshold temperature, and to lengthen the time interval when the temperature is below the threshold temperature. It is noted that the controller 542 shortens or lengthens the remainder of the time interval for the counting-down scenario. The controller 542 is configured to control the electromagnet 52 to continuously produce the magnetic force during the time interval and to stop producing the magnetic force after the time interval has elapsed.

Referring further to FIG. 5, the two-state switch 55 is configured to be set at a first configuration, where the two-state switch 55 electrically connects the first switch 43 and the first rectifier circuit 56, when the retaining element 51 is at the first position, and a second configuration, where the two-state switch 55 electrically connects the first switch 43 and the heating device 3, when the retaining element 51 is at the second position. When the extension part 513 of the retaining element 51 presses on the two-state switch 55, the two-state switch 55 is actuated to transition from the first configuration to the second configuration.

The first rectifier circuit 56 is configured to, when the first switch 43 and the second switch 44 are turned on and when the two-state switch 55 is at the first configuration, step down voltage of and perform rectification on input power from the power circuit 4 so as to provide electrical power to the electromagnet 52 and the timing element 54.

When the first switch 43 and the second switch 44 are turned on and when the two-state switch 55 is at the second configuration, the heating device 3 converts electrical power received from the power circuit 4 to thermal energy, and provides a fraction of the electrical power to the second rectifier circuit 57 by virtue of a voltage division configuration. Specifically, the heating device 3 is configured to divide a voltage received from the power circuit 4 to result in a voltage portion that is to be applied to the second rectifier circuit 57 so as to provide the fraction of the electrical power to the second rectifier circuit 57. Meanwhile, the second rectifier circuit 57 performs rectification on the fraction of the electrical power thus received so as to provide electrical power to the electromagnet 52 and the timing element 54.

An embodiment of use of the toaster 100 according to the disclosure is explained hereinafter.

Referring to FIGS. 1, 4, 7 and 9, when the bread is to be toasted, the activation element 23 is pressed downward to the turn-on position, driving the carriage 22 to move downward relative to the chassis 21. At the same time, the activation element 23 actuates the first switch 43 and the second switch 44 to turn on to make the control device 5 electrically connected to the mains electricity 800. Initially, the two-state switch 55 is at the first configuration where the two-state switch 55 electrically connects the first switch 43 and the first rectifier circuit 56, and the first rectifier circuit 56 provides electrical power to the electromagnet 52 and the timing element 54.

The timing element 54 is powered on once the timing element 54 receives the electrical power from the first rectifier circuit 56, starts counting the time interval, and immediately activates the electromagnet 52 to magnetically attract the retaining element 51 to move to and be retained at the second position, so that the retaining element 51 engages with the activation element 23 which is at the turn-on position. Meanwhile, the retaining element 51 at the second position presses on the two-state switch 55 via the extension part 513 to set the two-state switch 55 at the second configuration where the two-state switch 55 electrically connects the first switch 43 and the heating device 3. The heating device 3 converts electrical power received from the power circuit 4 to thermal energy to start toasting the bread. The second rectifier circuit 57 receives the fraction of the electrical power from the heating device 3 so as to provide electrical power to the timing element 54 and the electromagnet 52. The timing element 54 continues to operate with the electrical power provided by the second rectifier circuit 57 and keeps activating the electromagnet 52 to produce magnetic force.

After the time interval has elapsed, the timing element 54 controls the electromagnet 52 to stop producing magnetic force so as to release the retaining element 51. The retaining element 51 is driven by the elastic force provided by the elastic part 53 to move away from the electromagnet 52 to return to the first position, so that the two-state switch 55 is no longer pressed on by the extension part 513 of the retaining element 51 (see FIGS. 3 and 6). Accordingly, the two-state switch 55 transitions from the second configuration to the first configuration to electrically disconnect the heating device 3 from the first switch 43 of the power circuit 4. Moreover, the retaining element 51 returning to the first position releases the activation element 23 to allow the activation element 23 to be pushed upward by the reaction force provided by the elastic element 24 to move from the turn-on position back to the turn-off position. As a result, the carriage 22 is driven by the activation element 23 to move upward relative to the chassis 21 so that the bread carried by the carriage 22 is lifted to be accessible from outside the chassis 21. Meanwhile, the first switch 43 and the second switch 44 are no longer actuated by the activation element 23, and are thus turned off, so that electrical power provided by the power circuit 4 to the control device 5 is cut off, and the timing element 54 ceases operation.

In another scenario, after the time interval has elapsed, the timing element 54 controls the electromagnet 52 to stop producing magnetic force so as to release the retaining element 51. The retaining element 51 is biased to move away from the electromagnet 52 to return to the first position so as to release the activation element 23. If, because of mechanical failure, the activation element 23 is stuck and cannot be pushed upward by the reaction force provided by the elastic element 24 to return to the turn-off position, the activation element 23 would keep pressing on the first switch 43 and the second switch 44 and, as a result, the power circuit 4 would continue to provide electrical power to the control device 5. However, since the retaining element 51 has returned to the first position, the two-state switch 55 is no longer pressed on by the extension part 513 of the retaining element 51, and is thus switched to the first configuration to cut off electrical power provided to the heating device 3. Since the timing element 54 continues to be powered by the power circuit 4 (now via the first rectifier circuit 56) to remain in a state where it has finished counting the time interval and a lapse of the time interval has been determined, the timing element 54 will not activate the electromagnet 52 once again to magnetically attract the retaining element 51. In this way, the heating device 3 can be prevented from being powered to generate thermal energy once the time interval has elapsed, even in the event of a mechanical failure. The timing element 54 needs to be completely powered off before being powered on again so as to allow the timing element 54 to again activate the electromagnet 52 to magnetically attract the retaining element 51. Accordingly, the two-state switch 55 is able to be set again to the second configuration to electrically connect the first switch 43 and the heating device 3.

To sum up, by virtue of the design of the control device 5 which is electrically connected to the power circuit 4 and the heating device 3, after the time interval has elapsed, even if the activation element 23 is stuck at the turn-on position to keep pressing on the first switch 43 and the second switch 44, electrical power provided by the power circuit 4 to the heating device 3 would still be cut off so that the heating device 3 stops generating thermal energy. In this way, the safety defect of a conventional toaster that causes a heating element to keep heating the bread even after a heating time has elapsed can be fixed, and safety in using the toaster according to the disclosure is improved.

In the description above, for the purposes of explanation, numerous specific details have been set forth in order to provide a thorough understanding of the embodiment (s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:
1. A toaster comprising:
an activation element configured to move between a turn-off position and a turn-on position;
an elastic element configured to provide a reaction force that drives said activation element to move from the turn-on position to the turn-off position;
a power circuit configured to connect to mains electricity to receive electrical power therefrom, said power circuit including a live wire, a neutral wire, a first switch connected with said live wire, and a second switch connected with said neutral wire, wherein said first switch and said second switch are configured to be turned on when said activation element is at the turn-on position;
a heating device; and
a control device electrically connected to said heating device and said power circuit, and configured to receive electrical power from said power circuit when said first switch and said second switch are turned on, said control device including:
an electromagnet;
a retaining element that is magnetically attractable and that is configured to move between a first position and a second position, to stay at the first position when not being magnetically attracted by said electromagnet, and to stay at the second position when being magnetically attracted by said electromagnet in order to hold said activation element at the turn-on position;
a timing element configured to count a time interval, and to control said electromagnet to continuously produce, only during the time interval, a magnetic force that attracts said retaining element to move to and be retained at the second position;
a two-state switch connected between said first switch of said power circuit and said heating device, and configured to be set at a first configuration and a second configuration when said retaining element is at the first position and the second position, respectively;
a first rectifier circuit connected between said two-state switch and a common node to which said electromagnet and said timing element are connected, and configured to, when said first switch and said second switch are turned on and when said two-state switch is at the first configuration where said two-state switch electrically connects said first switch and said first rectifier circuit, provide electrical power to said electromagnet and said timing element; and
a second rectifier circuit connected between said heating device and the common node, and configured to, when said first switch and said second switch are turned on and when said two-state switch is at the second configuration where said two-state switch electrically connects said first switch and said heating device, provide electrical power to said electromagnet and said timing element;
wherein said heating device is configured to, when said two-state switch is at the second configuration, convert electrical power received from said power circuit to thermal energy, and provide a fraction of the electrical power to said second rectifier circuit, and
wherein said timing element is further configured to:
in response to said activation element being moved to the turn-on position, be powered on by receiving electrical power from said first rectifier circuit, start counting the time interval, and control said electro- magnet to produce the magnetic force to attract said retaining element to the second position, which in turn actuates said two-state switch to transition from the first configuration to the second configuration, when said two-state switch is at the second configuration, receive electrical power from said second rectifier circuit, and control said electromagnet to continuously produce the magnetic force during the time interval, and after the time interval has elapsed, control said electromagnet to stop producing the magnetic force, which in turn causes said retaining element to return from the second position to the first position, so that said activation element is released from the turn-on position and is moved to the turn-off position by the reaction force provided by said elastic element, and so that said two-state switch transitions from the second configuration to the first configuration to electrically disconnect said heating device from said first switch of said power circuit.

2. The toaster of claim 1, wherein:

said electromagnet has an attractive side;

said retaining element is at the attractive side of said electromagnet; and said retaining element includes:

a lock part that is configured to prevent said activation element at the turn-on position from moving toward the turn-off position;

a magnetic part that is to be magnetically attracted to the attractive side of said electromagnet;

an extension part that is configured to, when said retaining element is at the second position, press on said two-state switch in order to set said two-state switch at the second configuration; and an elastic part that is configured to provide an elastic force that drives said retaining element to move from the second position to the first position.

3. The toaster of claim 2, wherein said activation element includes:

a hook portion configured to engage with said lock part of said retaining element when said activation element is at the turn-on position, in order for said activation element to be held at the turn-on position;

a first press portion configured to press on said first switch of said power circuit when said activation element is at the turn-on position, in order to turn on said first switch; and a second press portion configured to press on said second switch of said power circuit when said activation element is at the turn-on position, in order to turn on said second switch.

4. The toaster of claim 1, wherein:

said two-state switch is a micro switch; and said two-state switch is in the first configuration when said two-state switch is not being pressed, and is in the second configuration when being pressed.

5. The toaster of claim 1, wherein each of said first switch and said second switch is a snap action switch.

6. The toaster of claim 1, wherein said timing element includes:

a temperature sensor configured to measure a temperature of said heating device; and a controller configured to count the time interval, to shorten the time interval when the temperature measured by said temperature sensor is above a threshold temperature, and to lengthen the time interval when the temperature is below the threshold temperature.

7. The toaster of claim 1, wherein said heating device is configured to divide a voltage received from said power circuit to result in a voltage portion that is to be applied to said second rectifier circuit so as to provide the fraction of the electrical power to said second rectifier circuit, said second rectifier circuit being configured to perform rectification on the fraction of the electrical power thus received so as to provide electrical power to said electromagnet and said timing element.

\* \* \* \* \*